United States Patent
Shrivastava et al.

(10) Patent No.: US 11,710,254 B2
(45) Date of Patent: Jul. 25, 2023

(54) NEURAL NETWORK OBJECT DETECTION

(71) Applicant: Ford Global Technologies, LLC, Dearborn, MI (US)

(72) Inventors: Shubham Shrivastava, Sunnyvale, CA (US); Punarjay Chakravarty, Campbell, CA (US); Gaurav Pandey, College Station, TX (US)

(73) Assignee: Ford Global Technologies, LLC, Dearborn, MI (US)

( * ) Notice: Subject to any disclaimer, the term of this patent is extended or adjusted under 35 U.S.C. 154(b) by 210 days.

(21) Appl. No.: 17/224,181

(22) Filed: Apr. 7, 2021

(65) Prior Publication Data

US 2022/0335647 A1 Oct. 20, 2022

(51) Int. Cl.
*G06T 7/73* (2017.01)
*G06N 3/08* (2023.01)
(Continued)

(52) U.S. Cl.
CPC ............... *G06T 7/74* (2017.01); *G06N 3/08* (2013.01); *G06V 10/82* (2022.01);
(Continued)

(58) Field of Classification Search
CPC ............ G06N 3/08; G06T 2207/10012; G06T 2207/20081; G06T 2207/20084;
(Continued)

(56) References Cited

U.S. PATENT DOCUMENTS 9,189,689 B2 11/2015 Chandraker et al.
10,621,747 B2 * 4/2020 Malisiewicz ..... G06F 18/24133
(Continued)

FOREIGN PATENT DOCUMENTS

CN 111220126 A 6/2020
WO 2020064955 A1 4/2020
(Continued)

OTHER PUBLICATIONS

Fang, et al., "3D Bounding Box Estimation for Autonomous Vehicles by Cascaded Geometric Constraints and Depurated 2D Detections Using 3D Results," School of Electronic and Information Engineering Xi'an Jiaotong University, China. Sep. 1, 2019, 11 pages.
(Continued)

*Primary Examiner* — Ian L Lemieux
(74) *Attorney, Agent, or Firm* — Frank A. MacKenizie; Bejin Bieneman PLC (57) ABSTRACT

A first six degree-of-freedom (DoF) pose of an object from a perspective of a first image sensor is determined with a neural network. A second six DoF pose of the object from a perspective of a second image sensor is determined with the neural network. A pose offset between the first and second six DoF poses is determined. A first projection offset is determined for a first two-dimensional (2D) bounding box generated from the first six DoF pose. A second projection offset is determined for a second 2D bounding box generated from the second six DoF pose. A total offset is determined by combining the pose offset, the first projection offset, and the second projection offset. Parameters of a loss function are updated based on the total offset. The updated parameters are provided to the neural network to obtain an updated total offset.

20 Claims, 6 Drawing Sheets

(51) Int. Cl.
*G06V 10/82* (2022.01)
*H04N 23/90* (2023.01)

(52) U.S. Cl.
CPC .............. *G06T 2207/20081* (2013.01); *G06T 2207/20084* (2013.01); *G06T 2207/30252* (2013.01); *H04N 23/90* (2023.01)

(58) Field of Classification Search
CPC . G06T 2207/30252; G06T 2207/30261; G06T 7/70; G06T 7/74; G06V 10/82; H04N 23/90
See application file for complete search history.

(56) References Cited

U.S. PATENT DOCUMENTS

| | | | |
|---|---|---|---|
| 10,977,827 B2* | 4/2021 | Mauchly | G06T 7/75 |
| 11,282,180 B1* | 3/2022 | Saxena | G06V 20/20 |
| 11,350,078 B2* | 5/2022 | Tang | H04N 13/275 |
| 11,373,332 B2* | 6/2022 | Lee | G06T 7/75 |
| 2017/0191826 A1 | 7/2017 | Nagori et al. | |
| 2019/0102677 A1* | 4/2019 | Kim | G06T 7/13 |
| 2019/0304134 A1 | 10/2019 | Mauchly et al. | |
| 2019/0370606 A1 | 12/2019 | Kehl et al. | |
| 2020/0005480 A1* | 1/2020 | Murase | G06T 7/73 |
| 2020/0026283 A1 | 1/2020 | Barnes et al. | |
| 2020/0066036 A1* | 2/2020 | Choi | G06T 7/75 |
| 2020/0193628 A1 | 6/2020 | Chakraborty et al. | |
| 2020/0218979 A1 | 7/2020 | Kwon et al. | |
| 2020/0272854 A1 | 8/2020 | Caesar | |
| 2020/0293796 A1 | 9/2020 | Sajjadi Mohammadabadi et al. | |
| 2020/0302241 A1 | 9/2020 | White et al. | |
| 2020/0302634 A1* | 9/2020 | Pollefeys | G06T 7/70 |
| 2021/0287022 A1* | 9/2021 | Ferroni | G06V 20/58 |
| 2021/0343043 A1* | 11/2021 | Chidlovskii | G06T 3/0075 |
| 2022/0262100 A1* | 8/2022 | Chandler | G06T 15/50 |
| 2022/0277472 A1* | 9/2022 | Birchfield | G06V 10/82 |

FOREIGN PATENT DOCUMENTS

| | | |
|---|---|---|
| WO | 2020188121 A1 | 9/2020 |
| WO | WO-2022200082 A1 * | 9/2022 |

OTHER PUBLICATIONS

Hu, et al., "Joint Monocular 3D Vehicle Detection and Tracking," Computer Vision Foundation, Nov. 26, 2018, 10 pages.

* cited by examiner

NEURAL NETWORK OBJECT DETECTION

BACKGROUND

A vehicle can be equipped with electronic and electro-mechanical components, e.g., computing devices, networks, sensors, controllers, etc. A vehicle computer can acquire data regarding the vehicle's environment and can operate the vehicle or at least some components thereof based on the acquired data. Vehicle sensors can provide data concerning routes to be traveled and objects to be avoided in the vehicle's environment. Operation of the vehicle can rely upon acquiring accurate and timely data regarding objects in a vehicle's environment while the vehicle is being operated.

DETAILED DESCRIPTION

A vehicle computer in a vehicle can be programmed to acquire data regarding the environment around the vehicle and to use the data to determine a path upon which to operate the vehicle in an autonomous or semi-autonomous mode. The vehicle can operate on a roadway based on the path by determining commands to direct the vehicle's powertrain, braking, and steering components to operate the vehicle to travel along the path. The data regarding the environment can include the location of one or more objects such as vehicles and pedestrians, etc., in the environment around the vehicle and can be used by the vehicle computer to operate the vehicle.

Determining a path can include performing three-dimensional (3D) object detection. That is, the vehicle computer detects objects in 3D space around the vehicle via sensor data. Typically, the vehicle computer detects an object via sensor data from a plurality of sensors, e.g., lidar, radar, cameras, etc. The vehicle computer then fuses the various forms of sensor data to determine a six degree-of-freedom (DoF) pose of the object relative to the vehicle. Six degree-of-freedom refers to the freedom of movement of an object in three-dimensional space (e.g., translation along three perpendicular axes and rotation about each of the three perpendicular axes). A six DoF pose of an object means a location relative to a coordinate system (e.g., a set of coordinates specifying a position in the coordinate system, e.g., X, Y, Z coordinates) and an orientation (e.g., a yaw, a pitch, and a roll) about each axis in the coordinate system. However, determining the six DoF pose of the object based on data fusion, i.e., incorporating data from different sensors and/or types of sensors into a common coordinate system of frame of reference, requires time synchronization and precise calibration of the sensors. Further, 3D object detection based on sensor data requires manual data annotation, i.e., providing labels that indicate objects within the data, which is labor intensive.

Advantageously, a neural network can be trained to accept a monocular image, i.e., a two-dimensional (2D) representation of 3D space, from one image sensor and to generate an output of a six DoF pose of an object included in the image. Techniques disclosed herein can train the neural network using images provided from two image sensors that provide different perspectives of an object. The neural network outputs a respective six DoF pose of the object from the perspective of the corresponding image sensor. A pose offset (as discussed below) is determined between respective 3D bounding boxes (as discussed below) generated based on corresponding six DoF poses. Further, projection offsets are determined between respective 2D projections (as discussed below) generated based on the corresponding 3D bounding box and a 2D ground truth bounding box. The pose offset and the projection offsets are combined and used to update parameters of a loss function for the neural network. The updated parameters are used to train the neural network to output an updated six DoF pose of the object. Techniques disclosed herein improve 3D object detection by determining a six DoF pose of an object from a monocular image without data annotation or data fusion, which can reduce computational resources required to detect objects in 3D space around the vehicle.

A system includes a first sensor a first image sensor positioned to obtain a first image of an object. A second image sensor positioned to obtain a second image of the object. a computer including a processor and a memory, the memory storing instructions executable by the processor to input the first image to a neural network that outputs a first six DoF pose of the object from a perspective of the first image sensor. The instructions further include instructions to input the second image to the neural network that outputs a second six DoF pose of the object from a perspective of the second image sensor. The instructions further include instructions to determine a pose offset between the first and second six DoF poses by determining a difference between respective 3D bounding boxes for the object determined based on the first and second six DoF poses. The instructions further include instructions to determine a first projection offset by determining a difference between a 2D ground truth bounding box for the object and a first 2D bounding box generated from the first six DoF pose. The instructions further include instructions to determine a second projection offset by determining a difference between the 2D ground truth bounding box for the object and a second 2D bounding box generated from the second six DoF pose. The instructions further include instructions to determine a total offset by combining the pose offset, the first projection offset, and the second projection offset. The instructions further include instructions to update parameters of a loss function based on the total offset and provide the updated parameters to the neural network to obtain an updated pose offset, updated first projections offset, and updated second projection offset that are then combined to obtain an updated total offset.

The instructions to determine the pose offset can further include instructions to generate a first 3D bounding box for the object from the perspective of the first image sensor based on the first six DoF pose and first dimensions. The instructions to determine the pose offset can further include instructions to generate a second 3D bounding box for the object from the perspective of the second image sensor based on the second six DoF pose and second dimensions. The instructions to determine the pose offset can further include instructions to compare the first 3D bounding box to the second 3D bounding box.

The instructions determine the pose offset can further include instructions to transform the second 3D bounding box based on a six DoF pose of the second image sensor relative to a six DoF pose of the first image sensor.

The transformed 3D bounding box may be determined in coordinates of a first coordinate system based on orthogonal x, y, and z axes having respective origins at the first image sensor.

The first 3D bounding box may be determined in coordinates of a first coordinate system based on orthogonal x, y, and z axes having respective origins at the first image sensor.

The second 3D bounding box may be determined in coordinates of a second coordinate system based on orthogonal x, y, and z axes having respective origins at the second image sensor.

The instructions to determine the first projection can further include instructions to, upon generating a first 3D bounding box for the object from the perspective of the first image sensor, generate the first 2D bounding box for the object by projecting the first 3D bounding box into an image plane defined by the first image sensor. The instructions to determine the first projection can further include instructions to compare the first 2D bounding box for the object to the 2D ground truth bounding box for the object.

The instructions to determine the second projection can further include instructions to, upon generating a second 3D bounding box for the object from the perspective of the second image sensor, transform the second 3D bounding box based on a six DoF pose of the second image sensor relative to a six DoF pose of the first image sensor. The instructions to determine the second projection can further include instructions to then generate the second 2D bounding box for the object by projecting the transformed 3D bounding box into an image plane defined by the first image sensor. The instructions to determine the second projection can further include instructions to compare the second 2D bounding box for the object to the 2D ground truth bounding box for the object.

The first six DoF pose may be determined in coordinates of a first coordinate system based on orthogonal x, y, and z axes having respective origins at the first image sensor and roll, pitch, and yaw rotations about the x, y, and z axes, respectively.

The second six DoF pose may be determined in coordinates of a second coordinate system based on orthogonal x, y, and z axes having respective origins at the second image sensor and roll, pitch, and yaw rotations about the x, y, and z axes, respectively.

The instructions can further include instructions to update parameters of the loss function until the updated total offset is less than a predetermined threshold.

The neural network may be trained to output a six DoF pose of the object when the updated total offset is less than the predetermined threshold.

The perspective of the second image sensor may be transverse and non-orthogonal to the perspective of the first image sensor.

The first image sensor may be spaced from the second image sensor by at least one meter.

A method includes determining a first six DoF pose of an object from a perspective of a first image sensor with a neural network. The method further includes determining a second six DoF pose of the object from a perspective of a second image sensor with the neural network. The method further includes determining a pose offset between the first and second six DoF poses by determining a difference between respective 3D bounding boxes for the object determined based on the first and second six DoF poses. The method further includes determining a first projection offset by determining a difference between a 2D ground truth bounding box for the object and a first 2D bounding box generated from the first six DoF pose. The method further includes determining a second projection offset by determining a difference between the 2D ground truth bounding box for the object and a second 2D bounding box generated from the second six DoF pose. The method further includes determining a total offset by combining the pose offset, the first projection offset, and the second projection offset. The method further includes updating parameters of a loss function based on the total offset and provide the updated parameters to the neural network to obtain an updated pose offset, updated first projections offset, and updated second projection offset that are then combined to obtained an updated total offset.

The method can further include updating parameters of the loss function until the updated total offset is less than a predetermined threshold.

The neural network may be trained to output a six DoF pose of the object when the updated total offset is less than the predetermined threshold.

The perspective of the second image sensor may be transverse and non-orthogonal to the perspective of the first image sensor.

The first image sensor may be spaced from the second image sensor by at least one meter.

A system includes a computer including a processor and a memory, the memory storing instructions executable by the processor to determine a first six DoF pose of an object from a perspective of a first image sensor with a neural network. The instructions further include instructions to determine a second six DoF pose of the object from a perspective of a second image sensor with the neural network. The instructions further include instructions to determine a pose offset between the first and second six DoF poses by determining a difference between respective 3D bounding boxes for the object determined based on the first and second six DoF poses. The instructions further include instructions to determine a first projection offset by determining a difference between a 2D ground truth bounding box for the object and a first 2D bounding box generated from the first six DoF pose. The instructions further include instructions to determine a second projection offset by determining a difference between the 2D ground truth bounding box for the object and a second 2D bounding box generated from the second six DoF pose. The instructions further include instructions to determine a total offset by combining the pose offset, the first projection offset, and the second projection offset. The instructions further include instructions to update parameters of a loss function based on the total offset and provide the updated parameters to the neural network to obtain an updated pose offset, updated first projections offset, and updated second projection offset that are then combined to obtained an updated total offset.

Further disclosed herein is a computing device programmed to execute any of the above method steps. Yet further disclosed herein is a computer program product, including a computer readable medium storing instructions executable by a computer processor, to execute an of the above method steps.

With reference to FIGS. 1-4, an example control system 100 includes a vehicle 105 and a remote computer 140. A vehicle computer 110 in the vehicle 105 receives data from sensors 115. The vehicle computer 110 is programmed to operate the vehicle 105 using a trained neural network, as discussed below.

Figure 1:
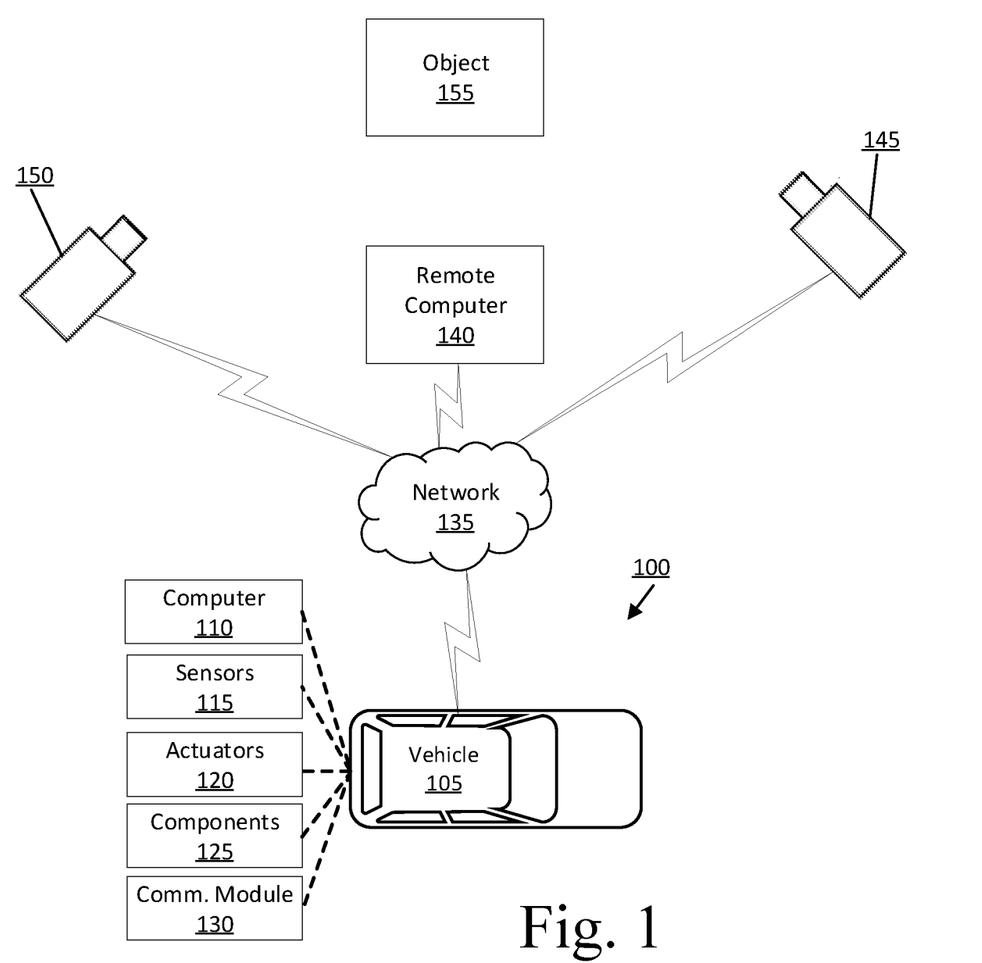
FIG. 1 is a block diagram illustrating an example vehicle control system for a vehicle.
Figure 3:
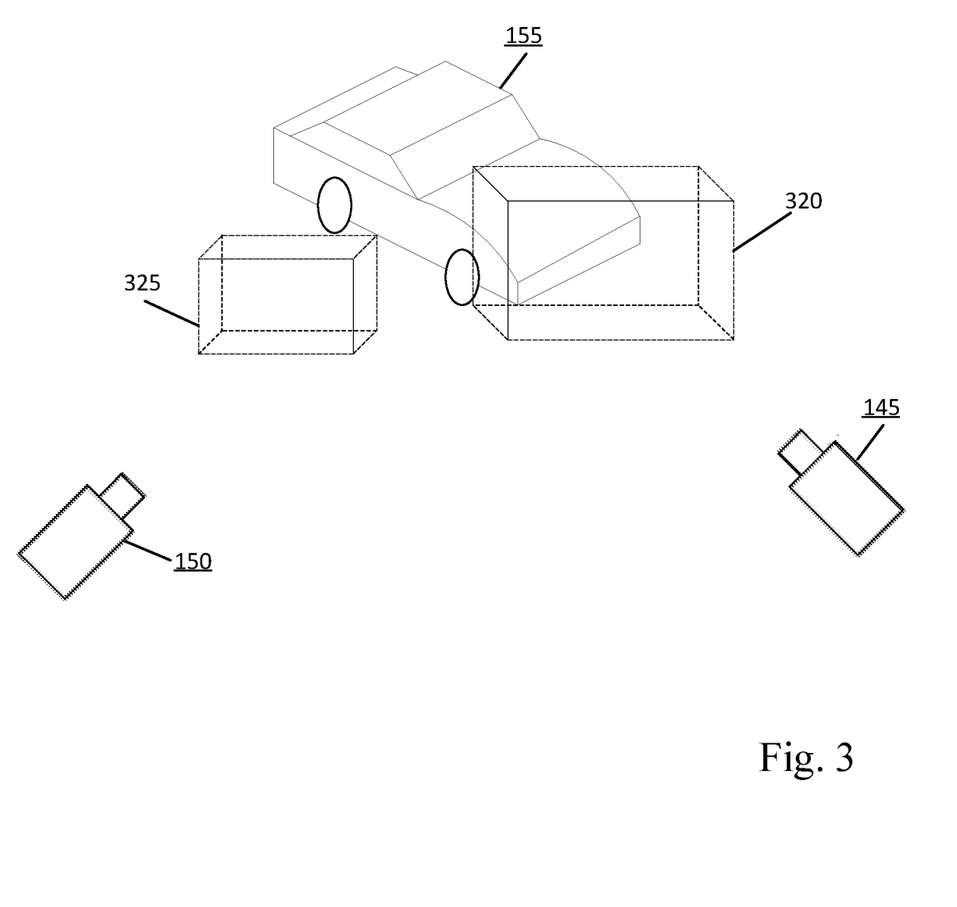
FIG. 3 is a diagram of an example object and example first and second three-dimensional bounding boxes for the object.
Figure 4:
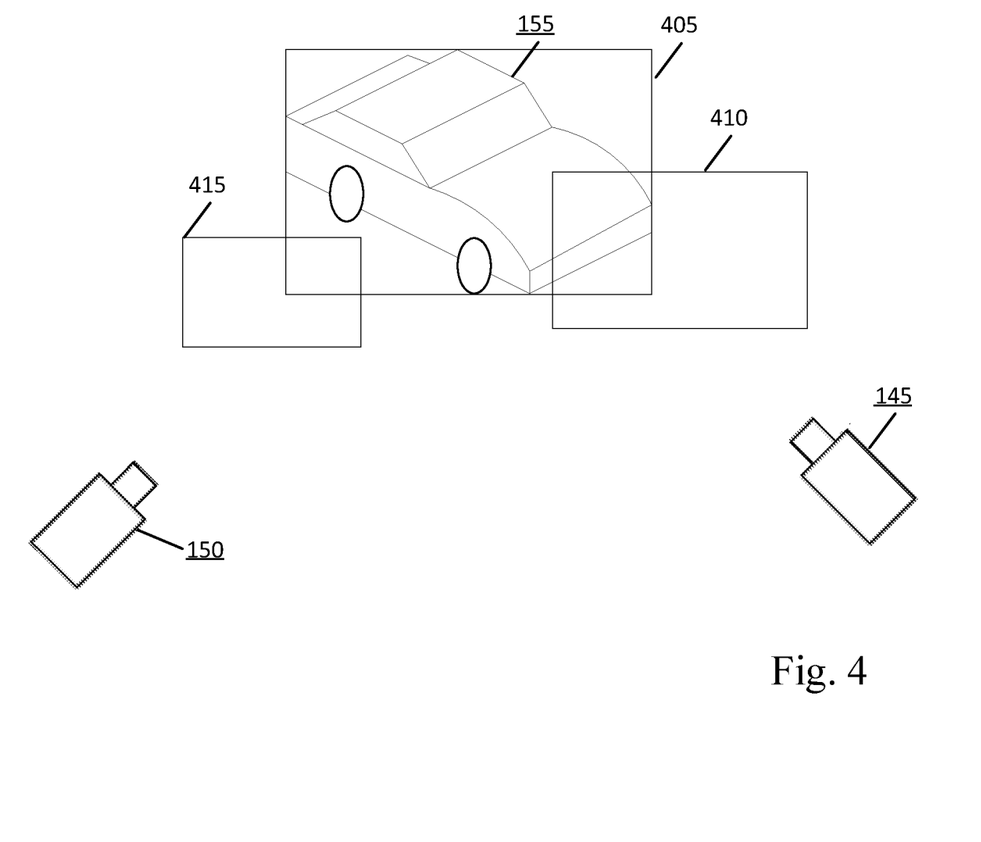
FIG. 4 is a diagram of an example two-dimensional ground truth bounding box for the object and example first and second projections of the object.

To train the neural network, the remote computer 140 receives data, e.g., image data, from a first image sensor 145 and a second image sensor 150. The remote computer 140 is programmed to input a first image to the neural network that outputs a first six degree-of-freedom (DoF) pose of an object 155 from a perspective of the first image sensor 145. The remote computer 140 is further programmed to input a second image to the neural network that outputs a second six DoF pose of the object 155 from a perspective of the second image sensor 150. The remote computer 140 is further programmed to determine a pose offset between the first and second six DoF poses by determining a difference between respective 3D bounding boxes 320, 325 for the object 155 determined based on the first and second six DoF poses. The remote computer 140 is further programmed to determine a first projection offset by determining a difference between a 2D ground truth bounding box 405 for the object 155 and a first 2D bounding box 410 generated from the first six DoF pose. The remote computer 140 is further programmed to determine a second projection offset by determining a difference between the 2D ground truth bounding box 405 for the object 155 and a second 2D bounding box 415 generated from the second six DoF pose. The remote computer 140 is further programmed to determine a total offset by combining the pose offset, the first projection offset, and the second projection offset. The remote computer 140 is further programmed to update parameters of a loss function based on the total offset and provide the updated parameters to the neural network to obtain an updated pose offset, updated first projections offset, and updated second projection offset that are then combined to obtained an updated total offset.

Turning now to FIG. 1, the vehicle 105 includes the vehicle computer 110, sensors 115, actuators 120 to actuate various vehicle components 125, and a vehicle communications module 130. The communications module 130 allows the vehicle computer 110 to communicate with the remote computer 140, and/or other vehicles, e.g., via a messaging or broadcast protocol such as Dedicated Short Range Communications (DSRC), cellular, and/or other protocol that can support vehicle-to-vehicle, vehicle-to infrastructure, vehicle-to-cloud communications, or the like, and/or via a packet network 135.

The vehicle computer 110 includes a processor and a memory such as are known. The memory includes one or more forms of computer-readable media, and stores instructions executable by the vehicle computer 110 for performing various operations, including as disclosed herein. The vehicle computer 110 can further include two or more computing devices operating in concert to carry out vehicle 105 operations including as described herein. Further, the vehicle computer 110 can be a generic computer with a processor and memory as described above, and/or may include an electronic control unit (ECU) or electronic controller or the like for a specific function or set of functions, and/or may include a dedicated electronic circuit including an ASIC that is manufactured for a particular operation, e.g., an ASIC for processing sensor data and/or communicating the sensor data. In another example, the vehicle computer 110 may include an FPGA (Field-Programmable Gate Array) which is an integrated circuit manufactured to be configurable by a user. Typically, a hardware description language such as VHDL (Very High Speed Integrated Circuit Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g. stored in a memory electrically connected to the FPGA circuit. In some examples, a combination of processor(s), ASIC(s), and/or FPGA circuits may be included in the vehicle computer 110.

The vehicle computer 110 may operate and/or monitor the vehicle 105 in an autonomous mode, a semi-autonomous mode, or a non-autonomous (or manual) mode, i.e., can control and/or monitor operation of the vehicle 105, including controlling and/or monitoring components 125. For purposes of this disclosure, an autonomous mode is defined as one in which each of vehicle 105 propulsion, braking, and steering are controlled by the vehicle computer 110; in a semi-autonomous mode the vehicle computer 110 controls one or two of vehicle 105 propulsion, braking, and steering; in a non-autonomous mode a human operator controls each of vehicle 105 propulsion, braking, and steering.

The vehicle computer 110 may include programming to operate one or more of vehicle 105 brakes, propulsion (e.g., control of acceleration in the vehicle 105 by controlling one or more of an internal combustion engine, electric motor, hybrid engine, etc.), steering, transmission, climate control, interior and/or exterior lights, horn, doors, etc., as well as to determine whether and when the vehicle computer 110, as opposed to a human operator, is to control such operations.

The vehicle computer 110 may include or be communicatively coupled to, e.g., via a vehicle communications network such as a communications bus as described further below, more than one processor, e.g., included in electronic controller units (ECUs) or the like included in the vehicle 105 for monitoring and/or controlling various vehicle components 125, e.g., a transmission controller, a brake controller, a steering controller, etc. The vehicle computer 110 is generally arranged for communications on a vehicle communication network that can include a bus in the vehicle 105 such as a controller area network (CAN) or the like, and/or other wired and/or wireless mechanisms.

Via the vehicle 105 network, the vehicle computer 110 may transmit messages to various devices in the vehicle 105 and/or receive messages (e.g., CAN messages) from the various devices, e.g., sensors 115, an actuator 120, ECUs, etc. Alternatively, or additionally, in cases where the vehicle computer 110 actually comprises a plurality of devices, the vehicle communication network may be used for communications between devices represented as the vehicle computer 110 in this disclosure. Further, as mentioned below, various controllers and/or sensors 115 may provide data to the vehicle computer 110 via the vehicle communication network.

Vehicle 105 sensors 115 may include a variety of devices such as are known to provide data to the vehicle computer 110. For example, the sensors 115 may include Light Detection And Ranging (LIDAR) sensor(s) 115, etc., disposed on a top of the vehicle 105, behind a vehicle 105 front windshield, around the vehicle 105, etc., that provide relative locations, sizes, and shapes of objects surrounding the vehicle 105. As another example, one or more radar sensors 115 fixed to vehicle 105 bumpers may provide data to provide locations of the objects, second vehicles, etc., relative to the location of the vehicle 105. The sensors 115 may further alternatively or additionally, for example, include camera sensor(s) 115, e.g. front view, side view, etc., providing images from an area surrounding the vehicle 105. In the context of this disclosure, an object is a physical, i.e., material, item that has mass and that can be represented by physical phenomena (e.g., light or other electromagnetic waves, or sound, etc.) detectable by sensors 115. Thus, the vehicle 105, as well as other items including as discussed below, fall within the definition of "object" herein.

The vehicle computer 110 is programmed to receive data from one or more sensors 115 substantially continuously, periodically, and/or when instructed by a remote computer 140, etc. The data may, for example, include a location of the vehicle 105. Location data specifies a point or points on a ground surface and may be in a known form, e.g., geo-coordinates such as latitude and longitude coordinates obtained via a navigation system, as is known, that uses the Global Positioning System (GPS). Additionally, or alternatively, the data can include a location of an object, e.g., a vehicle, a sign, a tree, etc., relative to the vehicle 105. As one example, the data may be image data of the environment around the vehicle 105. In such an example, the image data may include one or more objects and/or markings, e.g., lane markings, on or along a road. Image data herein means digital image data, e.g., comprising pixels with intensity and color values, that can be acquired by camera sensors 115. The sensors 115 can be mounted to any suitable location in or on the vehicle 105, e.g., on a vehicle 105 bumper, on a vehicle 105 roof, etc., to collect images of the environment around the vehicle 105.

The vehicle 105 actuators 120 are implemented via circuits, chips, or other electronic and or mechanical components that can actuate various vehicle subsystems in accordance with appropriate control signals as is known. The actuators 120 may be used to control components 125, including braking, acceleration, and steering of a vehicle 105.

In the context of the present disclosure, a vehicle component 125 is one or more hardware components adapted to perform a mechanical or electro-mechanical function or operation—such as moving the vehicle 105, slowing or stopping the vehicle 105, steering the vehicle 105, etc. Non-limiting examples of components 125 include a propulsion component (that includes, e.g., an internal combustion engine and/or an electric motor, etc.), a transmission component, a steering component (e.g., that may include one or more of a steering wheel, a steering rack, etc.), a suspension component (e.g., that may include one or more of a damper, e.g., a shock or a strut, a bushing, a spring, a control arm, a ball joint, a linkage, etc.), a brake component, a park assist component, an adaptive cruise control component, an adaptive steering component, one or more passive restraint systems (e.g., airbags), a movable seat, etc.

In addition, the vehicle computer 110 may be configured for communicating via a vehicle-to-vehicle communication module 130 or interface with devices outside of the vehicle 105, e.g., through a vehicle-to-vehicle (V2V) or vehicle-to-infrastructure (V2X) wireless communications (cellular and/or DSRC., etc.) to another vehicle, and/or to a remote computer 140 (typically via direct radio frequency communications). The communications module 130 could include one or more mechanisms, such as a transceiver, by which the computers of vehicles may communicate, including any desired combination of wireless (e.g., cellular, wireless, satellite, microwave and radio frequency) communication mechanisms and any desired network topology (or topologies when a plurality of communication mechanisms are utilized). Exemplary communications provided via the communications module 130 include cellular, Bluetooth, IEEE 802.11, dedicated short range communications (DSRC), and/or wide area networks (WAN), including the Internet, providing data communication services.

The network 135 represents one or more mechanisms by which a vehicle computer 110 may communicate with remote computing devices, e.g., the remote computer 140, another vehicle computer, etc. Accordingly, the network 135 can be one or more of various wired or wireless communication mechanisms, including any desired combination of wired (e.g., cable and fiber) and/or wireless (e.g., cellular, wireless, satellite, microwave, and radio frequency) communication mechanisms and any desired network topology (or topologies when multiple communication mechanisms are utilized). Exemplary communication networks include wireless communication networks (e.g., using Bluetooth®, Bluetooth® Low Energy (BLE), IEEE 802.11, vehicle-to-vehicle (V2V) such as Dedicated Short Range Communications (DSRC), etc.), local area networks (LAN) and/or wide area networks (WAN), including the Internet, providing data communication services.

The remote computer 140 can be a conventional computing device, i.e., including one or more processors and one or more memories, programmed to provide operations such as disclosed herein. Further, the remote computer 140 can be accessed via the network 135, e.g., the Internet, a cellular network, and/or or some other wide area network.

The vehicle computer 110 can receive sensor 115 data, e.g., image data obtained from a monocular camera, of the environment around the vehicle 105. The image data can include one or more objects around the vehicle 105. The vehicle computer 110 can determine a six DoF pose of an object 210 in an environment around the vehicle 105 by inputting a monocular image including the object into a neural network, such as a deep neural network (DNN) 200 (See FIG. 2). The DNN 200 can be trained (as discussed below) to accept the monocular image 202 as input and generate an output of a determination of a six DoF pose of the object 210. The six DoF pose of the object 210 can be determined in real world coordinates based on orthogonal x, y, and z axes and roll, pitch, and yaw rotations about the x, y, and z axes, respectively. The six DoF pose of the object 210 locates the object with respect to the sensor 115 that obtained the monocular image.

Figure 2:
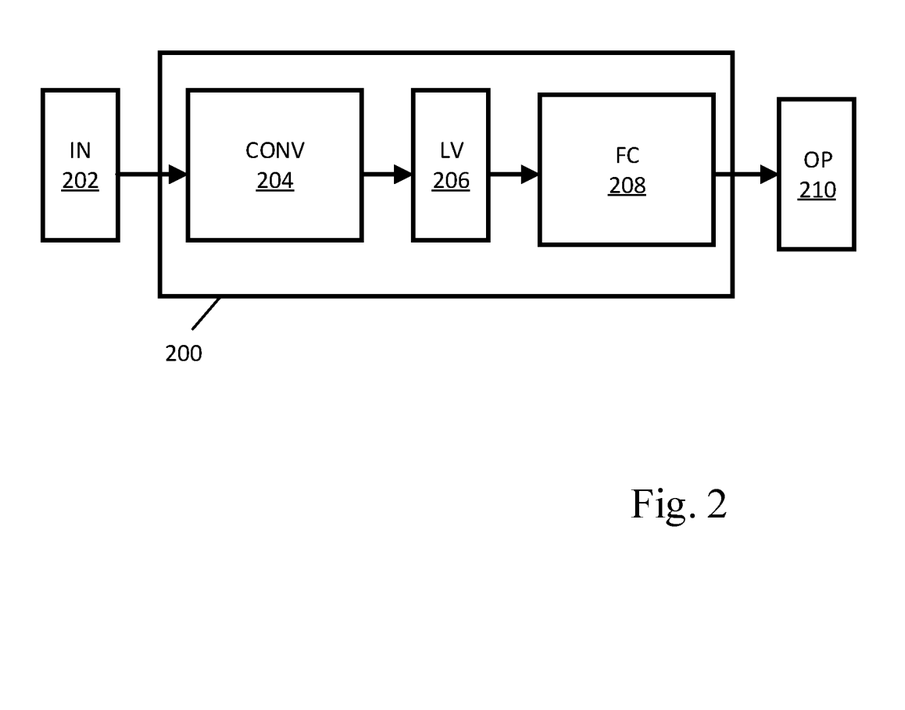
FIG. 2 is a diagram of an example neural network.

Upon determining the six DoF pose of the object 210, the vehicle computer 110 can, for example, generate a path to avoid the object. The vehicle computer 110 can then actuate one or more vehicle components to operate the vehicle 105 along the path to avoid the object. As used herein, a "path" is a set of points, e.g., that can be specified as coordinates with respect to a vehicle coordinate system and/or geo-coordinates, that the vehicle computer 110 is programmed to determine with a conventional navigation and/or path planning algorithm. A path can be specified according to one or more path polynomials. A path polynomial is a polynomial function of degree three or less that describes the motion of a vehicle on a ground surface. Motion of a vehicle on a roadway is described by a multi-dimensional state vector that includes vehicle location, orientation, speed, and acceleration. Specifically, the vehicle motion vector can include positions in x, y, z, yaw, pitch, roll, yaw rate, pitch rate, roll rate, heading velocity and heading acceleration that can be determined by fitting a polynomial function to successive 2D locations included in the vehicle motion vector with respect to the ground surface, for example.

Further for example, the path polynomial p(x) is a model that predicts the path as a line traced by a polynomial equation. The path polynomial p(x) predicts the path for a predetermined upcoming distance x, by determining a lateral coordinate p, e.g., measured in meters:

$$p(x)=a_0+a_1x+a_2x^2+a_3x^3 \quad (3)$$

where $a_0$ an offset, i.e., a lateral distance between the path and a center line of the host vehicle 105 at the upcoming distance x, $a_1$ is a heading angle of the path, $a_2$ is the curvature of the path, and $a_3$ is the curvature rate of the path.

FIG. 2 is a diagram of a deep neural network (DNN) 200. The DNN 200 can be a software program executing on the remote computer 140. Once trained, the DNN 200 can be downloaded to the vehicle computer 110. The vehicle computer 110 can use the DNN 200 to operate the vehicle 105. For example, the vehicle computer 110 can use the six DoF poses for objects around the vehicle 105 to determine a path for operating the vehicle 105, as discussed above.

The DNN 200 can include a plurality of convolutional layers (CONV) 204 that process input images (IN) 202 by convolving the input images 202 using convolution kernels to determine latent variables (LV) 206. The DNN 200 includes a plurality of fully-connected layers (FC) 208 that process the latent variables 206 to produce a six DoF pose of an object (OP) 210. The DNN 200 can input an image 202 from a camera sensor 115 included in a vehicle 105 that includes an object to determine a six DoF pose of the object 210.

The DNN 200 is trained by processing a dataset that includes a plurality of sets of images including various objects 155. The sets of images include a first image obtained from a first image sensor 145 and a second image obtained from a second image sensor 150.

The first and second image sensors 145, 150 can be deployed in a fixed or stationary manner, e.g., mounted to a pole, mounted to a building, etc. The fields of view of the first and second image sensors 145, 150 are substantially unmoving and unchanging. The fields of view of the first and second image sensors 145, 150 include an object 155. That is, the first and second image sensors 145, 150 are positioned to detect the object 155 (see FIG. 3). Said differently, the first and second image sensors 145, 150 are each positioned to obtain a respective image of the object 155.

The second image sensor 150 provides a perspective of the object 155 that is different than the first image sensor 145. For example, the perspective from the second image sensor 150 may be transverse and non-orthogonal perspective from the first image sensor 145. That is, while the perspectives are different, the perspective from the second image sensor 150 includes a same side of the object 155, e.g., a front, as the perspective from the first image sensor 145.

The first and second image sensors 145, 150 are monocular cameras arranged to view the object 155 with lateral separation. The lateral separation, also referred to as the baseline, is a shortest distance between the first and second image sensors 145, 150. The lateral separation causes the first and second image sensors 145, 150 to generate images where corresponding points in each image will be displaced with respect to the image by an amount that is a function of the lateral separation of the first and second image sensors 145, 150 and the distance of the point in space from the first and second image sensors 145, 150. For example, the first and second image sensors 145, 150 may be spaced from each other by at least one meter.

The first and second image sensors 145, 150 can provide digital images, e.g., as frames of video in a compressed format such as MPEG or the like. MPEG refers to a set of standards generally promulgated by the International Standards Organization/International Electrical Commission Moving Picture Experts Group (MPEG). Each frame in video data from the first and second image sensors 145, 150 can be a specified number of pixels wide by a specified number of pixels tall. An object 155 can be identified in a frame, including location(s) of pixels in the image used to depict the object 155, according to various image or pattern recognition techniques.

The first and second image sensors 145, 150 may provide the first and second images, respectively, to the remote computer 140, e.g., via the network 135. As another example, the first and second image sensors 145, 150 each may be directly connected to the remote computer 140, e.g., via a wired connection through which the first and second image sensors 145, 150 can provide the first and second images, respectively.

To train the DNN 200, the remote computer 140 receives a first image from the first image sensor 145 and a second image from the second image sensor 150. Upon receiving the first image, the remote computer 140 can input the first image into the DNN 200 that outputs a first six DoF pose of the object 155 from the perspective of the first image sensor 145. The first six DoF pose can be determined in coordinates of a first coordinate system based on orthogonal x, y, and z axes having respective origins at the first image sensor 145 and roll, pitch, and yaw rotations about the x, y, and z axes, respectively. That is, the first six DoF pose can include a location in three orthogonal coordinates relative to the first image sensor 145 and an orientation in three rotations about the axes of each of the three orthogonal coordinates. In addition to determining the first six DoF pose of the object 155, the DNN 200 can output first dimensions (e.g., length, width, height) for the object 155 from the perspective of the first image sensor 145.

Similarly, upon receiving the second image, the remote computer 140 can input the second image into the DNN 200 that outputs a second six DoF pose of the object 155 from the perspective of the second image sensor 150. The second six DoF pose can be determined in coordinates of a second coordinate system based on orthogonal x, y, and z axes having respective origins at the second image sensor 150 and roll, pitch, and yaw rotations about the x, y, and z axes, respectively. That is, the second six DoF pose can include a location in three orthogonal coordinates relative to the second image sensor 150 and an orientation in three rotations about the axes of each of the three orthogonal coordinates. In addition to determining the second six DoF pose of the object 155, the DNN 200 can output second dimensions (e.g., length, width, height) for the object 155 from the perspective of the second image sensor 150.

Turning now to FIG. 3, the remote computer 140 can generate a first three dimensional (3D) bounding box 320 for the object 155 based on the first six DoF pose and the first dimensions. That is, the first 3D bounding box 320 is generated from the perspective of the first image sensor 145. A "bounding box" is a closed boundary defining a set of pixels. For example, the pixels within a bounding box can represent a same object, e.g., a bounding box can define pixels representing an image of an object. Said differently, a bounding box is typically defined as a smallest rectangular prism that includes all of the pixels of the corresponding object. The first 3D bounding box 320 is described by contextual information including a center and eight corners, which are expressed as x, y, and z coordinates in the first coordinate system. The first six DoF pose can be the center of the first 3D bounding box 320. The remote computer 140 can then determine the coordinates of the eight corners from the first dimensions by using geometric transformation. Because the first 3D bounding box 320 is generated from the perspective of the first image sensor 145, the first 3D bounding box 320 may be offset relative to real-world coordinates of the object 155 prior to the DNN 200 being trained.

For example, the remote computer 140 can determine a lower front right corner of the first 3D bounding box 320 based on i) a first line that is half the length of the object and extends forward from the center along the x axis of the first coordinate system and at the pitch specified by the first six DoF pose, ii) a second line that is half the width of the object and extends rightward from an end of the first line along the y axis of the first coordinate system and at the yaw specified by the first six DoF pose, and iii) a third line that is half the height of the object and extends downward from an end of the second line along the z axis of the first coordinate system and at the roll specified by the first six DoF pose. The coordinates for the lower front right corner are determined from an end of the third line. The other seven corners can be determined by changing the directionality of at least one of the first line, the second line, or the third line (e.g., forward to backward, leftward to rightward, and/or upward to downward).

The remote computer 140 can generate a second 3D bounding box 325 for the object 155 based on the second six DoF pose and the second dimensions. That is, the second 3D bounding box 325 is generated from the perspective of the second image sensor 150. The second 3D bounding box 325 is described by contextual information including a center and eight corners, which are expressed as x, y, and z coordinates in the second coordinate system. The second six DoF pose can be the center of the second 3D bounding box. The remote computer 140 can then determine the coordinates of the eight corners from the second dimensions by using geometric transformation., e.g., in substantially the same manner as discussed above with respect to the first 3D bounding box 320. Because the second 3D bounding box 325 is generated from the perspective of the second image sensor 150, the second 3D bounding box 325 may be offset relative to real-world coordinates of the object 155 prior to the DNN 200 being trained. When the DNN 200 is trained, the coordinates of the second 3D bounding box 325 may correspond, within a predetermined threshold (as discussed below), to real-world coordinates of the object 155 such that the second 3D bounding box 325 matches the first 3D bounding box 320, within a predetermined threshold (as discussed below). In this situation, the first and second 3D bounding boxes 320, 325 enclose the object 155 regardless of the perspective of the image sensor 145, 150.

After generating the second 3D bounding box 325, the remote computer 140 can transform the second 3D bounding box 325 based on a six DoF pose of the second image sensor 150 relative to a six DoF pose of the first image sensor 145. The respective six DoF poses of the first and second image sensors 145, 150 may be stored, e.g., in a memory of the remote computer 140. The respective six DoF poses of the first and second image sensors 145, 150 may, for example, be manually input by a user. The respective six DoF poses locates the first and second image sensors 145, 150 with respect to global coordinates. The remote computer 140 can compare the six DoF pose of the first image sensor 145 to the six DoF pose of the second image sensor 150 to determine a transformation offset. A transformation offset specifies a translational difference, e.g., measured in meters, along each of the three orthogonal axes and a rotational difference, e.g., measured in degrees, about each of the three orthogonal axes between the six DoF pose of the first image sensor 145 and the six DoF pose of the second image sensor 150. The remote computer 140 can then generate a transformed 3D bounding box based on the transformation offset.

The transformed 3D bounding box is described by contextual information including a center and eight corners, which are expressed as x, y, and z coordinates in the first coordinate system. The remote computer 140 determines the center of the transformed 3D bounding box by combining the transformation offset and the center of the second 3D bounding box 325, e.g., using a geometric transformation to update the center of the second 3D bounding box 325 according to the translational and rotation differences specified by the transformation offset. Additionally, the remote computer 140 determines the coordinates of the eight corners by combining the transformation offset and the coordinates of each corner of the second 3D bounding box 325, e.g., in substantially the same manner as discussed immediately above.

Alternatively, the remote computer 140 can transform the first 3D bounding box 320 based on the six DoF pose of the first image sensor 145 relative to the six DoF pose of the second image sensor 150, e.g., in substantially the same manner as discussed immediately above. In this situation, the transformed 3D bounding box is determined in coordinates of the second coordinate system.

The remote computer 140 can then determine a pose offset between the transformed 3D bounding box and the first 3D bounding box 320 (or second 3D bounding box 325). A pose offset is a difference between the coordinates of the eight corners of the transformed 3D bounding box and the corresponding coordinates of the eight corners of the first 3D bounding box 320 (or second 3D bounding box 325). In an example in which the remote computer 140 transforms the second 3D bounding box 325, the remote computer 140 can compare the first 3D bounding box 320 to the transformed 3D bounding box to determine the pose offset. To determine the pose offset, the remote computer 140 can determine a difference between corresponding coordinates of the first 3D bounding box 320 and the transformed 3D bounding box. For example, the remote computer 140 can determine a distance from each corner of the first 3D bounding box 320 to the corresponding corner of the transformed 3D bounding box. In such an example, after determining the distances between each of the corresponding corners, the remote computer 140 can use a mean square error (MSE) to determine an average difference between the corners of the first 3D bounding box 320 and the transformed 3D bounding box relative to the first coordinate system. The pose offset is determined from the average difference. In an example in which the remote computer 140 transforms the first 3D bounding box 320, the remote computer 140 can compare the second 3D bounding box 325 to the transformed 3D bounding box to determine the pose offset, e.g., in substantially the same manner as discussed immediately above.

Turning now to FIG. 4, in an example in which the remote computer 140 transforms the second 3D bounding box 325, the remote computer 140 can generate a first 2D bounding box 410 based on the first 3D bounding box 320. Additionally, the remote computer 140 can generate a second 2D bounding box 415 based on the transformed 3D bounding box, e.g., in substantially the same manner as discussed immediately below with respect to generating the first 2D bounding box 410. For example, the remote computer 140 can generate the first 2D bounding box 410 by rendering the first 3D bounding box 320. Rendering can produce a first 2D bounding box 410 from a first 3D bounding box 320 by determining a virtual camera point of view from which to project the first 3D bounding box 320 to a 2D plane. That is, the first 2D bounding box 410 and the second 2D bounding box 415 are described by contextual information including four corners, which are expressed as x and z coordinates in the first coordinate system.

A virtual camera can be provided by programming of the remote computer 140 to generate a first 2D bounding box 410 from a first 3D bounding box 320. The remote computer 140 can generate virtual light rays that pass from a virtual image sensor through a virtual lens, obeying the laws of physics just as if the image sensor and lens were physical objects. The remote computer 140 inserts data into the virtual image sensor corresponding to the appearance of the portion of a first 3D bounding box 320 that a ray of light emitted by the feature points of the first 3D bounding box 320 and passing through a physical lens would produce on a physical image sensor. By situating a virtual camera at a selected location and orientation with respect to the first 3D bounding box 320, a first 2D bounding box 410 corresponding to a selected viewpoint with respect to an object 155 can be generated.

The virtual camera point of view includes location and orientation data for an optical axis of the virtual camera and data regarding the magnification of the virtual camera lens. The virtual camera point of view is determined based on the location and orientation of a virtual camera with respect to an object 155. The location of the virtual camera is selected to be the location of the first image sensor 145, and the orientation of the virtual camera corresponds to the orientation of the first image sensor 145. The location and the orientation of the first image sensor 145 are determined from the six DoF pose of the first image sensor 145. That is, the 2D plane is an image plane defined by the first image sensor 145. Projecting the first 3D bounding box 320 onto a 2D plane corresponds to determining which feature points of the first 3D bounding box 320 would be visible to a camera acquiring an image of the first 3D bounding box 320 from the selected location and orientation. Because the first 2D bounding box 410 was generated from a first 3D bounding box 320 based on a virtual camera at a selected location and orientation, data regarding the location and orientation of the feature points illustrated in the first 2D bounding box 410 is known.

Alternatively, the first 2D bounding box 410 can be constructed from the first 3D bounding box 320 based on coordinates of feature points in the first 3D bounding box 320. Specifically, the remote computer 140 can plot the x and z coordinates of each feature in the first 3D bounding box 320 into a 2D plane. In this situation, the x coordinates can be plotted along a horizontal axis, and the z coordinates can be plotted along a vertical axis. The first 2D bounding box 410 includes a field of view within which all of the feature points of the first 3D bounding box 320 are plotted. The field of view is defined by the first image sensor 145.

In an example in which the remote computer 140 transforms the first 3D bounding box 320, the remote computer 140 can generate the first 2D bounding box 410 based on the transformed 3D bounding box, e.g., in substantially the same manner as discussed immediately above. Additionally, the remote computer 140 can generate the second 2D bounding box 415 based on the second 3D bounding box 325, e.g., in substantially the same manner as discussed immediately above. In this situation, the 2D plane is an image plane defined by the second image sensor 150. That is, the first 2D bounding box 410 and the second 2D bounding box 415 are described by contextual information including four corners, which are expressed as x and z coordinates in the second coordinate system.

The remote computer 140 can determine a first projection offset between the first 2D bounding box 410 and a 2D ground truth bounding box 405 (as discussed below). A first projection offset is a difference between the coordinates of the first 2D bounding box 410 and the corresponding coordinates of the 2D ground truth bounding box 405. The remote computer 140 can compare the first 2D bounding box 410 to the 2D ground truth bounding box 405 to determine the first projection offset. To determine the first projection offset, the remote computer 140 can determine a difference between corresponding coordinates of the first 2D bounding box 410 and the 2D ground truth bounding box 405, e.g., in substantially the same manner as discussed above with respect to determining the pose offset, e.g., using MSE. As another example, the remote computer 140 can use an intersection over union (IoU) to determine a ratio of an area of intersection between the first 2D bounding box 410 and the 2D ground truth bounding box 405 to a total area of the first 2D bounding box 410 and the 2D ground truth bounding box 405. In this situation, the first projection offset is determined from the ratio.

The remote computer 140 can determine a second projection offset between the second 2D bounding box 415 and the 2D ground truth bounding box 405. A second projection offset is a difference between the coordinates of the second 2D bounding box 415 and the corresponding coordinates of the 2D ground truth bounding box 405. The remote computer 140 can compare the second 2D bounding box 415 to the 2D ground truth bounding box 405 to determine the second projection offset. To determine the second projection offset, the remote computer 140 can determine a difference between corresponding coordinates of the second 2D bounding box 415 and the 2D ground truth bounding box 405, e.g., in substantially the same manner as discussed above with respect to determining the first projection offset.

A 2D object detector can be used to generate the 2D ground truth bounding box 405 for the object 155. The 2D object detector, as is known, is a neural network trained to detect objects in an image and generate a 2D bounding box for the detected objects. The 2D object detector can be trained using image data as ground truth. Image data can be manually labelled by human operators. The human operators can also determine 2D bounding boxes for the labeled objects. The ground truth including labeled 2D bounding boxes can be compared to the output from the 2D object detector to train the 2D object detector to correctly label the image data. In an example in which the remote computer 140 transforms the second 3D bounding box 325, the remote computer 140 can input the first image to the 2D object detector that can be trained to output the 2D ground truth bounding box 405 for the object 155 from the perspective of the first image sensor 145. That is, the 2D ground truth bounding box 405 is described by contextual information including four corners, which are expressed as x and z coordinates in the first coordinate system. In an example in which the remote computer 140 transforms the first 3D bounding box 320, the remote computer 140 can input the second image to the 2D object detector that can be trained to output the 2D ground truth bounding box 405 for the object 155 from the perspective of the second image sensor 150. That is, the 2D ground truth bounding box 405 is described by contextual information including four corners, which are expressed as x and z coordinates in the second coordinate system.

The remote computer 140 can determine a total offset by combining the pose offset, the first projection offset, and the second projection offset. That is, the total offset may be a function, e.g., an average, a weighted sum, a weighted product, etc., of the pose offset, the first projection offset, and the second projection offset. For example, the total offset can be determined according to Equation 1 below $$\text{Total Offset} = \lambda_1 P_o + \frac{\lambda_2}{2}(P_f + P_s) \tag{1}$$

where $P_o$ is the pose offset, $P_f$ is the first projection offset, $P_s$ is the second projection offset, and $\lambda_1$, $\lambda_2$ are loss weights, e.g., between 0 and 1. The loss weights $\lambda_1$, $\lambda_2$ may be predetermined based on empirical testing to determine how much the pose offset, the first projection offset, and a second projection offset influence generation of a six DoF pose for an object 155.

The remote computer 140 can update parameters of a loss function based on the total offset. Back-propagation can compute a loss function based on the first six DoF pose and the second six DoF pose. A loss function is a mathematical function that maps values such as the first and second six DoF poses into real numbers that can be compared to determine a cost during training. In this example, the cost is the total offset. The loss function determines how closely the first six DoF pose matches the second six DoF pose and is used to adjust the parameters or weights that control the DNN.

Parameters or weights include coefficients used by linear and/or non-linear equations included in fully-connected layers. Fully-connected layers process the latent variables output by other hidden layers. Upon determining the total offset, the remote computer 140 can update the parameters of the loss function. For example, the remote computer 140 can systematically vary these parameters or weights and compare the output results to a desired result minimizing the loss function. As a result of varying the parameters or weights over a plurality of trials over a plurality of input images, a set of parameters or weights that achieve a result that minimizes the loss function can be determined. As another example, the remote computer 140 can optimize parameters of the loss function by applying gradient descent to the loss function. Gradient descent calculates a gradient of the loss function with respect to the current parameters. The gradient indicates a direction and magnitude to move along the loss function to determine a new set of parameters. That is, the remote computer 140 can determine a new set of parameters based on the gradient and the loss function. Applying gradient descent reduces an amount of time for training by using the loss function to identify specific adjustments to the parameters as opposed to selecting new parameters at random.

The remote computer 140 can then provide the updated parameters to the DNN 200. The remote computer 140 can then determine an updated total offset based on the first and second images and the updated DNN 200. For example, the remote computer 140 can input the first image to the updated DNN 200 that can output an updated first six DoF pose of the object 155 from the perspective of the first image sensor 145. Additionally, the remote computer 140 can input the second image to the updated DNN 200 that can output an updated second six DoF pose of the object 155 from the perspective of the second image sensor 150. The remote computer 140 can then determine an updated pose offset based on the updated first and second six DoF poses, e.g., in substantially the same manner as discussed above with respect to determining the pose offset. Further, the remote computer 140 can determine updated first and second projection offsets based on the updated first and second six DoF poses, e.g., in substantially the same manner as discussed above with respect to determining the respective projection offset. The remote computer 140 can then combine the updated pose offset, the updated first projection offset, and the updated second projection offset, e.g., according to Equation 1 above, to determine the updated total offset.

The remote computer 140 can subsequently determine updated parameters, e.g., in substantially the same manner as discussed above with respect to updating the parameters of the loss function, until the updated total offset is less than a predetermined threshold. That is, parameters controlling the DNN 200 processing are varied until output first six DoF poses matches, within the predetermined threshold, the output second six DoF poses for each of the plurality of objects in the training dataset. The predetermined threshold may be determined based on, e.g., empirical testing to determine a maximum total offset at which a vehicle computer 110 can operate a vehicle 105 without impacting detected objects (e.g., based on resolution in sensor 115 data). Upon determining the total offset, the remote computer 140 can compare the total offset to the predetermined threshold. The predetermined threshold may be stored, e.g., in a memory of the remote computer 140. When the updated total offset is less than the predetermined threshold, the DNN 200 is trained to accept one monocular image 202 including an object as input and to generate a six DoF pose of the object 210.

Figure 5:
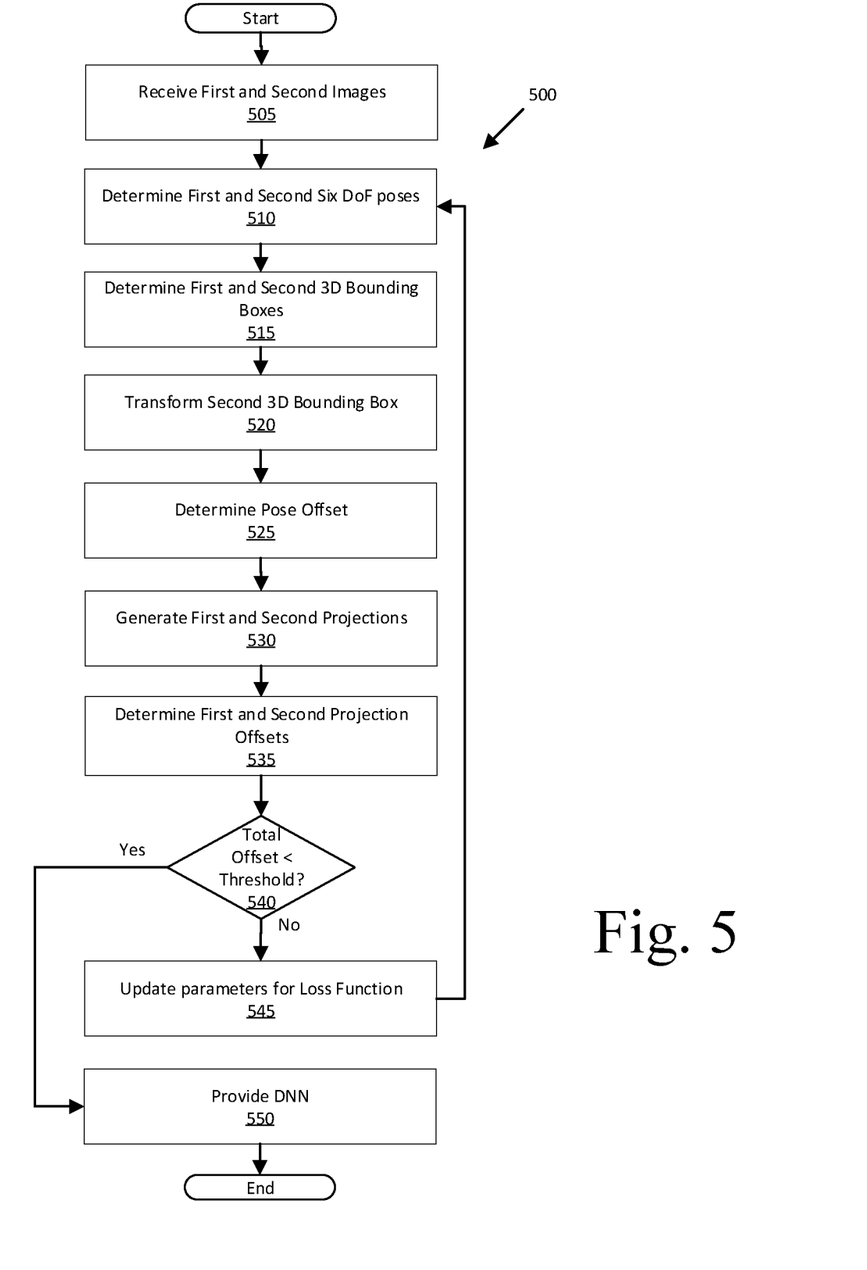
FIG. 5 is an example flowchart for training the neural network.

FIG. 5 is a diagram of an example process 500 for training a neural network to accept a monocular image as input and to generate a six DoF pose of an object included in the monocular image. The process 500 begins in a block 505. The process 500 can be carried out by a remote computer 140 executing program instructions stored in a memory thereof.

In the block 505, the remote computer 140 receives the first image from a first image sensor 145 and the second image from a second image sensor 150, e.g., via the network 135. The first and second images each include an object 155. The second image provides a different perspective of the object 155 than the first image, as discussed above. The process 500 continues in a block 510.

In the block 510, the remote computer 140 determines a first six DoF pose of the object 155 from the perspective of the first image sensor 145. For example, the remote computer 140 can input the first image into the DNN 200 that outputs the first six DoF pose of the object 155 and first dimensions for the object 155 from the perspective of the first image sensor 145. The first six DoF pose can be determined in coordinates of a first coordinate system, as discussed above.

Additionally, the remote computer 140 determines a second six DoF pose of the object 155 from the perspective of the second image sensor 150. For example, the remote computer 140 can input the second image into the DNN 200 that outputs the second six DoF pose of the object 155 and second dimensions for the object 155 from the perspective of the second image sensor 150. The second six DoF pose can be determined in coordinates of a second coordinate system, as discussed above. The process 500 continues in a block 515.

In the block 515, the remote computer 140 generates a first 3D bounding box 320 for the object 155 based on the first six DoF pose and the first dimensions. The first six DoF pose can be the center of the first 3D bounding box 320, and the remote computer 140 can determine the coordinates of the corners of the first 3D bounding box 320 from the first dimensions, e.g., using geometric transformation, as discussed above.

Additionally, the remote computer 140 generates a second 3D bounding box 325 for the object 155 based on the second six DoF pose and the second dimensions. The second six DoF pose can be the center of the second 3D bounding box 325, and the remote computer 140 can determine the coordinates of the corners of the second 3D bounding box 325 from the second dimensions, e.g., using geometric transformation, as discussed above. The process 500 continues in a block 520.

In the block 520, the remote computer 140 transforms the second 3D bounding box 325 based on a six DoF pose of the second image sensor 150 relative to a six DoF pose of the first image sensor 145. The remote computer 140 can compare the six DoF pose of the first image sensor 145 to the six DoF pose of the second image sensor 150 to determine a transformation offset, as discussed above. The remote computer 140 can then generate a transformed 3D bounding box by combining the second 3D bounding box 325 and the transformation offset, e.g., using geometric transformation, as discussed above. In this situation, the transformed 3D bounding box is determined in coordinates of the first coordinate system.

Alternatively, the remote computer 140 can transform the first 3D bounding box 320 based on a six DoF pose of the second image sensor 150 relative to a six DoF pose of the first image sensor 145, as discussed above. In this situation, the transformed 3D bounding box is determined in coordinates of the second coordinate system. The process 500 continues in a block 525.

In the block 525, in an example in which the remote computer 140 transforms the second 3D bounding box, the remote computer 140 determines a pose offset between the first 3D bounding box 320 and the transformed 3D bounding box. The remote computer 140 can determine a difference between corresponding coordinates of the first 3D bounding box 320 and the transformed 3D bounding box, as discussed above. The pose offset is determined from the difference. Alternatively, in an example in which the remote computer 140 transforms the first 3D bounding box, the remote computer 140 determine the pose offset between the second 3D bounding box and the transformed 3D bounding box, e.g., in substantially the same manner as discussed immediately above. The process 500 continues in a block 530.

In the block 530, the remote computer 140 generates a first 2D bounding box 410 based on the first 3D bounding box 320 in an example in which the remote computer 140 transformed the second 3D bounding box 325. For example, the remote computer 140 can generate the first 2D bounding box 410 by rendering the first 3D bounding box 320, as discussed above. As another example, the remote computer 140 can plot the x and z coordinates of each feature in the first 3D bounding box 320 into a 2D plane, e.g., an image plane defined by the first image sensor 145. Alternatively, the remote computer 140 can generate the first 2D bounding box based on the transformed 3D bounding box in an example in which the remote computer 140 transformed the first 3D bounding box 320, e.g., in substantially the same manner as discussed above.

Additionally, the remote computer 140 generates a second 2D bounding box 415 based on the transformed 3D bounding box in an example in which the remote computer 140 transformed the second 3D bounding box 325, e.g., in substantially the same manner as discussed above with respect to generating the first 2D bounding box 410. Alternatively, the remote computer 140 can generate the second 2D bounding box based on the second 3D bounding box 325 in an example, in which the remote computer 140 transformed the first 3D bounding box 320, e.g., in substantially the same manner as discussed above. The process 500 continues in a block 535.

In the block 535, the remote computer 140 determines a first projection offset between the first 2D bounding box 410 and a 2D ground truth bounding box 405 from a difference between corresponding coordinates of the first 2D bounding box 410 and the 2D ground truth bounding box 405, as discussed above. A 2D object detector can be used to generate the 2D ground truth bounding box 405 for the object 155, as discussed above. Additionally, the remote computer 140 determines a second projection offset between the second 2D bounding box 415 and the 2D ground truth bounding box 405, e.g., in substantially the same manner as determining the first projection offset. The process 500 continues in a block 540.

In the block 540, the remote computer 140 determines whether a total offset is less than a predetermined threshold. The remote computer 140 determine the total offset by combining the pose offset, the first projection offset, and the second projection offset, e.g., according to Equation 1, as discussed above. If the total offset is less than the predetermined threshold, then the process 500 continues in a block 550. Otherwise, the process 500 continues in a block 545.

In the block 545, the remote computer 140 updates parameters of a loss function based on the total offset, as discussed above. The remote computer 140 can then provide the updated parameters to the DNN 200. The process 500 returns to the block 510.

In the block 550, the remote computer 140 determines that the DNN 200 is trained to output a six DoF for an object 210. The remote computer 140 can then provide the DNN 200, e.g., data describing the DNN 200, to a vehicle computer 110, e.g., via the network 135. The process 500 ends following the block 550.

Figure 6:
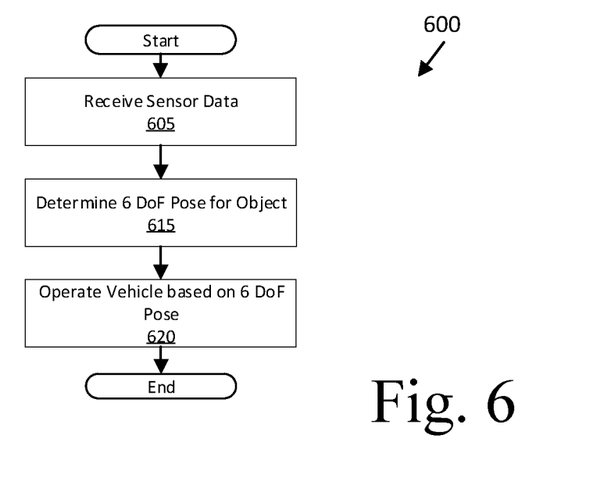
FIG. 6 is an example flowchart for operating a vehicle.

FIG. 6 is a diagram of an example process 600 for determining a six DoF pose of an object around a vehicle 105 based on a monocular image. The process 600 begins in a block 605. The process 600 can be carried out by a vehicle computer 110 included in the vehicle 105 executing program instructions stored in a memory thereof.

In the block 605, the vehicle computer 110 receives data from one or more sensors 115, e.g., via a vehicle network. For example, the vehicle computer 110 can receive image data, e.g., from one or more image sensors 115. The image data may include data about the environment around the vehicle 105, e.g., one or more objects. The process 600 continues in a block 610.

In the block 610, the vehicle computer 110 uses the trained DNN 200 to determine a six DoF pose of an object 210 around the vehicle 105. For example, the vehicle computer 110 can input an image 202 obtained in the block 605 to the DNN 200. The image can include an object around the vehicle 105. The DNN 200 can the output the six DoF pose of the object 210. The process 600 continues in a block 615.

In the block 615, the vehicle computer 110 operates the vehicle 105 based on the six DoF pose of the object 210. For example, the vehicle computer 110 can generate a planned path that avoids the object, as discussed above. The vehicle computer 110 can then actuate one or more vehicle components 125 to move the vehicle along the planned path to avoid the object. The process 600 ends following the block 615.

As used herein, the adverb "substantially" means that a shape, structure, measurement, quantity, time, etc. may deviate from an exact described geometry, distance, measurement, quantity, time, etc., because of imperfections in materials, machining, manufacturing, transmission of data, computational speed, etc.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board first computer, a computer workstation, a server, a desktop, notebook, laptop, or handheld computer, or some other computing system and/or device.

Computers and computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

Memory may include a computer-readable medium (also referred to as a processor-readable medium) that includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of an ECU. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the media, processes, systems, methods, heuristics, etc. described herein, it should be understood that, although the steps of such processes, etc. have been described as occurring according to a certain ordered sequence, such processes may be practiced with the described steps performed in an order other than the order described herein. It further should be understood that certain steps may be performed simultaneously, that other steps may be added, or that certain steps described herein may be omitted. In other words, the descriptions of processes herein are provided for the purpose of illustrating certain embodiments and should in no way be construed so as to limit the claims.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system, comprising:
a first image sensor positioned to obtain a first image of an object;
a second image sensor positioned to obtain a second image of the object;
a computer including a processor and a memory, the memory storing instructions executable by the processor to:
input the first image to a neural network that outputs a first six degree-of-freedom (DoF) pose of the object from a perspective of the first image sensor;
input the second image to the neural network that outputs a second six DoF pose of the object from a perspective of the second image sensor;
determine a pose offset between the first and second six DoF poses by determining a difference between respective three-dimensional (3D) bounding boxes for the object determined based on the first and second six DoF poses;
determine a first projection offset by determining a difference between a two-dimensional (2D) ground truth bounding box for the object and a first 2D bounding box generated from the first six DoF pose;
determine a second projection offset by determining a difference between the 2D ground truth bounding box for the object and a second 2D bounding box generated from the second six DoF pose;
determine a total offset by combining the pose offset, the first projection offset, and the second projection offset; and
update parameters of a loss function based on the total offset and provide the updated parameters to the neural network to obtain an updated pose offset, updated first projections offset, and updated second projection offset that are then combined to obtain an updated total offset.

2. The system of claim 1, wherein the instructions to determine the pose offset further include instructions to:
generate a first 3D bounding box for the object from the perspective of the first image sensor based on the first six DoF pose and first dimensions;
generate a second 3D bounding box for the object from the perspective of the second image sensor based on the second six DoF pose and second dimensions; and
compare the first 3D bounding box to the second 3D bounding box.

3. The system of claim 2, wherein the instructions to determine the pose offset further include instructions to transform the second 3D bounding box based on a six DoF pose of the second image sensor relative to a six DoF pose of the first image sensor.

4. The system of claim 3, wherein the transformed 3D bounding box is determined in coordinates of a first coordinate system based on orthogonal x, y, and z axes having respective origins at the first image sensor.

5. The system of claim 2, wherein the first 3D bounding box is determined in coordinates of a first coordinate system based on orthogonal x, y, and z axes having respective origins at the first image sensor.

6. The system of claim 2, wherein the second 3D bounding box is determined in coordinates of a second coordinate system based on orthogonal x, y, and z axes having respective origins at the second image sensor.

7. The system of claim 1, wherein the instructions to determine the first projection further include instructions to:
upon generating a first 3D bounding box for the object from the perspective of the first image sensor, generate the first 2D bounding box for the object by projecting the first 3D bounding box into an image plane defined by the first image sensor; and
compare the first 2D bounding box for the object to the 2D ground truth bounding box for the object.

8. The system of claim 1, wherein the instructions to determine the second projection further include instructions to:
upon generating a second 3D bounding box for the object from the perspective of the second image sensor, transform the second 3D bounding box based on a six DoF pose of the second image sensor relative to a six DoF pose of the first image sensor;
then generate the second 2D bounding box for the object by projecting the transformed 3D bounding box into an image plane defined by the first image sensor; and
compare the second 2D bounding box for the object to the 2D ground truth bounding box for the object.

9. The system of claim 1, wherein the first six DoF pose is determined in coordinates of a first coordinate system based on orthogonal x, y, and z axes having respective origins at the first image sensor and roll, pitch, and yaw rotations about the x, y, and z axes, respectively.

10. The system of claim 1, wherein the second six DoF pose is determined in coordinates of a second coordinate system based on orthogonal x, y, and z axes having respective origins at the second image sensor and roll, pitch, and yaw rotations about the x, y, and z axes, respectively.

11. The system of claim 1, wherein the instructions further include instructions to update parameters of the loss function until the updated total offset is less than a predetermined threshold.

12. The system of claim 11, wherein the neural network is trained to output a six DoF pose of the object when the updated total offset is less than the predetermined threshold.

13. The system of claim 1, wherein the perspective of the second image sensor is transverse and non-orthogonal to the perspective of the first image sensor.

14. The system of claim 1, wherein the first image sensor is spaced from the second image sensor by at least one meter.

15. A method, comprising:
determining a first six degree-of-freedom (DoF) pose of an object from a perspective of a first image sensor with a neural network;
determining a second six DoF pose of the object from a perspective of a second image sensor with the neural network;
determining a pose offset between the first and second six DoF poses by determining a difference between respective three-dimensional (3D) bounding boxes for the object determined based on the first and second six DoF poses;
determining a first projection offset by determining a difference between a two-dimensional (2D) ground truth bounding box for the object and a first 2D bounding box generated from the first six DoF pose;
determining a second projection offset by determining a difference between the 2D ground truth bounding box for the object and a second 2D bounding box generated from the second six DoF pose;
determining a total offset by combining the pose offset, the first projection offset, and the second projection offset; and
updating parameters of a loss function based on the total offset and provide the updated parameters to the neural network to obtain an updated pose offset, updated first projections offset, and updated second projection offset that are then combined to obtain an updated total offset.

16. The method of claim 15, further comprising updating parameters of the loss function until the updated total offset is less than a predetermined threshold.

17. The method of claim 16, wherein the neural network is trained to output a six DoF pose of the object when the updated total offset is less than the predetermined threshold.

18. The method of claim 15, wherein the perspective of the second image sensor is transverse and non-orthogonal to the perspective of the first image sensor.

19. The method of claim 15, wherein the first image sensor is spaced from the second image sensor by at least one meter.

20. A system, comprising a computer including a processor and a memory, the memory storing instructions executable by the processor to:
   determine a first six degree-of-freedom (DoF) pose of an object from a perspective of a first image sensor with a neural network;
   determine a second six DoF pose of the object from a perspective of a second image sensor with the neural network;
   determine a pose offset between the first and second six DoF poses by determining a difference between respective three-dimensional (3D) bounding boxes for the object determined based on the first and second six DoF poses;
   determine a first projection offset by determining a difference between a two-dimensional (2D) ground truth bounding box for the object and a first 2D bounding box generated from the first six DoF pose;
   determine a second projection offset by determining a difference between the 2D ground truth bounding box for the object and a second 2D bounding box generated from the second six DoF pose;
   determine a total offset by combining the pose offset, the first projection offset, and the second projection offset; and
   update parameters of a loss function based on the total offset and provide the updated parameters to the neural network to obtain an updated pose offset, updated first projections offset, and updated second projection offset that are then combined to obtain an updated total offset.

* * * * *